US012782586B2

(12) United States Patent
Bastien et al.

(10) Patent No.: US 12,782,586 B2
(45) Date of Patent: Nov. 3, 2026

(54) VEHICLE RECORDING BASED TERRAIN OBJECTIVE CHARACTERISTIC DETERMINATION

(71) Applicant: Woven by Toyota, Inc., Tokyo (JP)

(72) Inventors: Jean-François Bastien, Tokyo (JP); Peter Berger, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 230 days.

(21) Appl. No.: 18/451,051

(22) Filed: Aug. 16, 2023

(65) Prior Publication Data

US 2025/0060490 A1 Feb. 20, 2025

(51) Int. Cl.
*G01S 19/45* (2010.01)

(52) U.S. Cl.
CPC .................................... *G01S 19/45* (2013.01)

(58) Field of Classification Search
None
See application file for complete search history.

(56) References Cited

U.S. PATENT DOCUMENTS

2007/0032929 A1 2/2007 Yoshioka et al.
2017/0113664 A1* 4/2017 Nix ...................... G07C 5/0891
2022/0161816 A1* 5/2022 Gyllenhammar ...... G06V 20/56
2022/0196849 A1* 6/2022 Chen ....................... G01S 19/51
2022/0301427 A1 9/2022 Ueno et al.
2023/0040552 A1 2/2023 Lee et al.
2023/0063930 A1 3/2023 Ichida et al.

FOREIGN PATENT DOCUMENTS

JP 2021-026554 A 2/2021
JP 2021-174413 A 11/2021
JP 2022-143227 A 10/2022

* cited by examiner

*Primary Examiner* — Christopher A Buksa
(74) *Attorney, Agent, or Firm* — HAUPTMAN HAM, LLP

(57) ABSTRACT

Vehicle recording based terrain objective characteristic determination is performed by detecting a vehicle reaction of a vehicle, the vehicle reaction triggered by a threshold reading of at least one triggering sensor of the vehicle, recording an output of the at least one triggering sensor and at least one related sensor of the vehicle in response to detecting the vehicle reaction, and determining an objective characteristic of a terrain based on the recorded output of the at least one triggering sensor, the recorded output of the at least one related sensor, and at least one characteristic of the vehicle.

20 Claims, 8 Drawing Sheets

VEHICLE RECORDING BASED TERRAIN OBJECTIVE CHARACTERISTIC DETERMINATION

BACKGROUND

Vehicle-mounted sensors are becoming much more common. The advent of autonomous driving has added not only traditional cameras to vehicles, but also an array of sensors, such as LiDAR, complementing existing sensors, such as GPS. The combination of these sensors enables vehicles to obtain a detailed representation of the world around them. Connectivity to the internet allows vehicles to communicate to centralized servers. Although the sensor data composing this representation is mostly overwritten due to storage concerns, some of the information is stored for purposes of creating simulation environments, for training and prediction, such as ADAS, maps, using live-actionable or historic information. The usability of this information increases with the quality. In general, as the quality of information increases, required data transfer and storage capacity also increases.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
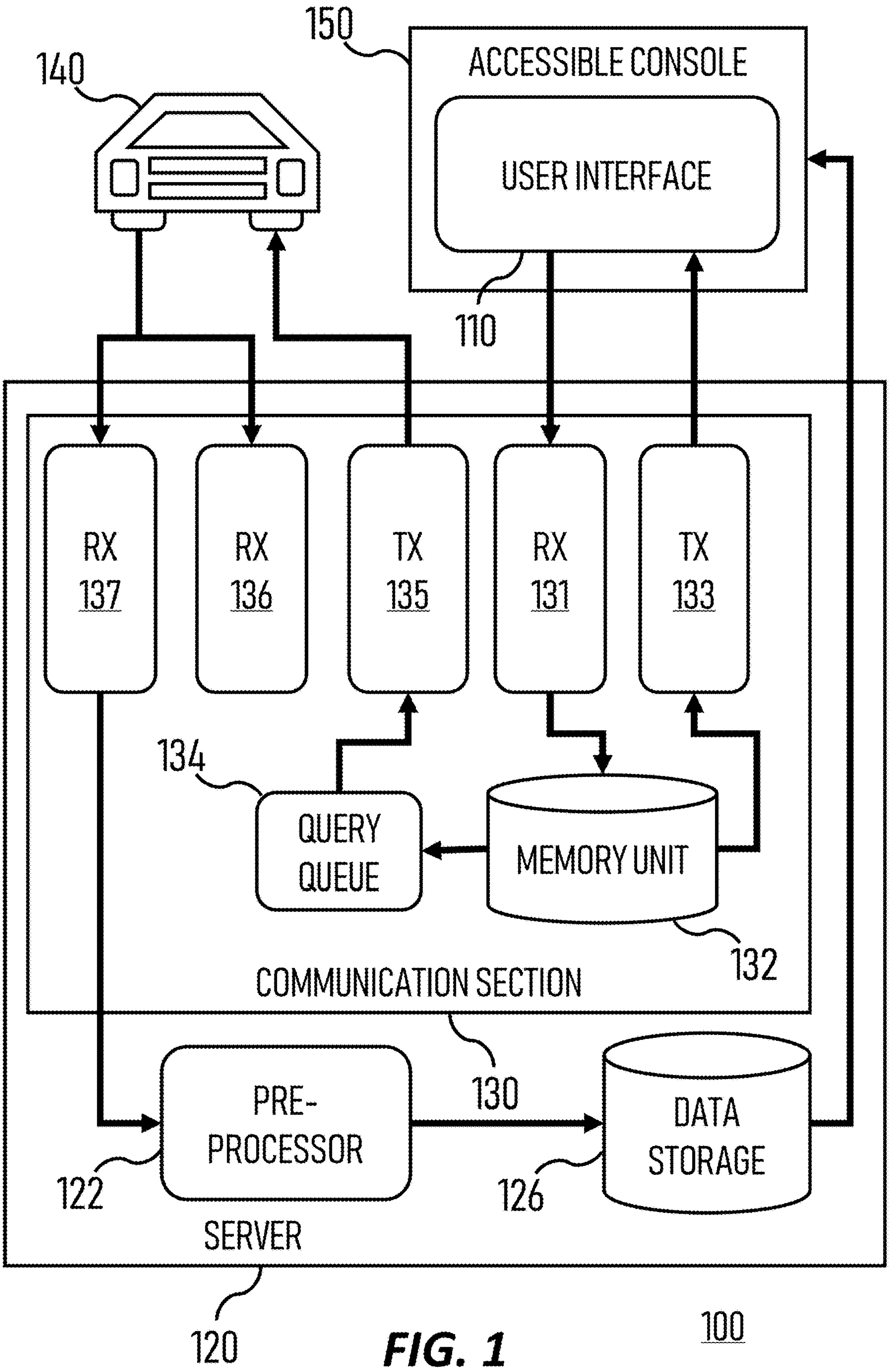
FIG. 1 is a schematic diagram of a system for mobile computing network queried content capture in accordance with at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A user, such as a software developer, an insurance provider, a market researcher and a law enforcement officer, is able to use an on-demand data retrieval (ODDR) system to enter a data request into a user interface, such as a graphical user interface (GUI). The software developer is a software developer who develops applications, middleware or OS (operating systems) to be run on the vehicle, for example. Example applications include automated-driving system applications, such as an object recognition application, a road recognition application, a sensor fusion application, a localization application, a path planner application, a controller application, etc. The data request is analyzed and stored in a server and then transmitted to a vehicle by the server. On the server side, the data requests are stored in a storage unit and a request queue is generated based on the stored requests. The user is able to see or request updates on the status of the data request. For example, while the data request is still within the server prior to transmission to the vehicle, the status may be indicated as “pending.” Once the server transmits the data request to the vehicle, the status may be updated to “submitted.” This allows the user to see and track the status of data requests made to the vehicle. One of ordinary skill in the art would recognize that the description refers to a vehicle for the sake of clarity; however, the description is applicable to groups of vehicles in addition to a single vehicle. The description is also applicable to non-vehicle computing devices which are outfitted with at least one sensor, and some form of connectivity.

The user interface for generating the data request includes forms related to vehicle identifying information, data types being requested, start time and end time. In some embodiments, the data types being requested include text fields for syntax entry, which enables more complex queries, such as a request for data collected exclusively while performing a “left turn on red”. In some embodiments, the start time and the end time are absolute times, such as Unix time, that is an elapsed time since a Unix epoch time. In some embodiments, the start time and the end time are relative times to the time that the data request is received by the vehicle. In some embodiments, the start time and the end time are relative times to a trigger event. The trigger event is the occurrence within the vehicle or in the environment surrounding the vehicle about which the user is seeking data or receipt of a data request by the vehicle. For example, a trigger event resulting from an environment surrounding the vehicle includes sudden acceleration, sudden braking, capturing an image of a target of a data request, detecting of a target of a data request or other suitable occurrences. The user information for monitoring a status of data requests includes identifying information of the data request and a status of the data request, such as pending or submitted.

In some embodiments, once the data request is received by the vehicle, the data request is processed to make the data request agnostic as to the source of the data request. In some embodiments, a data request identification (ID) is assigned to the received data request by the vehicle, for example by a request abstractor in the vehicle. In some embodiments, the data request ID is assigned to the data request prior to transmission of the data request to the vehicle. In some embodiments, a data request is generated by an application running in the vehicle and the application assigns the data request ID. In other words, the data is processed in a consistent manner regardless of a program or system that transmits the data request to the vehicle. In some embodiments, a data request is generated by a software component stored within the vehicle, and the data is processed in consistent with a data request received from an external device. This helps to sharing the same data collection software components among trigger data collection, where an application generates a data collection request to the logger, and the ODDR-based external data collection request.

In some embodiments, once the data request is received by the vehicle, the data request is processed to make the data request agnostic to the sensors within the vehicle and the server. In some embodiments, the data request is generated by an application running in the vehicle. In some embodiments, an application programming interface (API) is usable to make the data request from the application agnostic to the sensors within the vehicle or information from the server. This helps to maximize the user's ability to collect data without programming a request for specific sensor models. The data request is then transferred to a data collector and the requested data is collected in response to occurrence of the trigger event. In the situation where the trigger event had already occurred, such as a traffic accident, the data request is fulfilled based on data stored within a storage device within the vehicle. A time frame, i.e., start and end times, of the collected data is determined based on the data request. The collected data is transferred back to the server.

The collected data is then stored in the server and a notification is sent to the user regarding completion of the data request. For example, the status of the data request is updated to "complete" on the user interface.

In some instances, a budget management system or a payment system is implemented on the server side or vehicle side, such that the user is charged a fee for a data request. The fee is payable either at the submission of the request or at completion of data collection. The fee is adjustable based on the type and amount of data requested. In some embodiments, when the total amount of fee that is charged to the user reaches a maximum threshold of user's budget, the data request from the user is rejected.

This ODDR system allows users to access information collected by vehicle in an on-demand style. That is, the data is not necessarily continuously collected, but could be collected to satisfy specific desires of a user. In some embodiments, the ODDR system helps users, such as software developers, collecting data to update the design, implementation and parameter tuning of their software in an exploratory way based on collected data so that the users are able to continuously improve the software by delivering updates from the server to the vehicle via network, for example, as an Over-the-Air (OTA) update. In some embodiments, the ODDR system helps machine learning developers who develops machine learning model for the applications collecting data to train the model with the data which was not available when the model was initially developed so that the machine learning developers are able to update the models to fix weakness and issues of the model continuously. In some instances, an insurance provider would be able collect data related to a traffic accident. In some instances, law enforcement would be able to collect information related to a crime or a traffic accident.

Vehicles that experience triggered reactions to extreme situations, such as Antilock Brake System (ABS) engagement in response to a high force applied to the brake, seatbelt lock and/or airbag deployment in response to extreme deceleration, traction control activation in response to wheel slippage, other Operational Design Domain (ODD) limitations, etc., have information useful for warning other vehicles. However, the information currently used to determine the situation and the reaction itself are insufficient to determine whether a warning should be issued to other vehicles and to which vehicles the warning is applicable.

For example, if traction control activates, the information required for activation, e.g.—detection that all power has gone to the right wheel while the left wheel is still, may be insufficient to determine whether the wheel slippage is an isolated incident, or due to a terrain characteristic, such as a weather event. The information required for activation may be insufficient to determine whether other vehicles would also experience wheel slippage even in the case that slippage is due to a terrain characteristic, such as extreme weather.

At least some embodiments of the subject disclosure utilize existing triggers for reacting under extreme circumstances to record the event from the perspective of sensors, including those sensors used to determine the instant trigger and additional sensors, in order to gather enough information to understand relevance to other vehicles.

FIG. 1 is a schematic diagram of a request retrieval system 100 in accordance with some embodiments. The request retrieval system 100 includes a user interface (UI) 110. The UI 110 is configured to receive a user request for data from a vehicle 140. The request retrieval system 100 further includes a server 120 configured to receive the user request from the UI 110; transmit the user request to the vehicle 140; receive data from the vehicle 140; and provide the data to the user via an accessible console 150. The server 120 includes a communication section 130 for communicating with the UI 110 and the vehicle 140. The request retrieval system 100 further includes an accessible console 150 configured to communicate data collected from the vehicle 140 to the user.

The UI 110 is configured to receive input instructions from the user. In some embodiments, the user includes a software developer. In some embodiments, the user includes a machine learning model developer. In some embodiments, the user includes an insurance provider. In some embodiments, the user includes law enforcement personnel. In some embodiments, the user includes a market research company. The UI 110 provides options for the user to select what type of vehicle and what type of data is being requested. In some embodiments, the UI 110 is capable of generating the data request using forms related to vehicle identifying information, data types being requested, start time and end time. In some embodiments, the start time and the end time are absolute times, such as Unix time, that is an elapsed time since a Unix epoch time. In some embodiments, the start time and the end time are relative times to the time that the data request is received by the vehicle. In some embodiments, the start time and the end time are relative times to a trigger event. In some embodiments, the UI 110 also provides the user with options for selecting a trigger event and a data collection duration relative to the trigger event. In some embodiments, the UI 110 includes information related to a type of vehicle from which data is requested. In some embodiments, the UI 110 includes vehicle ID which is able to uniquely identify a vehicle as a target of the request. For example, the vehicle ID includes a universally unique identifier (UUID) format. In some embodiments, the UI 110 includes data type that is able to identify the source of the data that user wants to collect. For example, the data type includes sensor ID of sensor that sensor data is collected from, application ID of application that application log is collected from. In some embodiment, the format of the sensor ID and application ID includes a universally unique identifier (UUID) format. In some embodiments, the UI 110 includes drop down menus. In some embodiments, the UI 110 includes editable fields for receiving information related to a data request. In some embodiments, the UI 110 includes fields for entry of a query language, such as SQL. In some embodiments, the UI 110 provides information regarding what data option types are available to the user. In some embodiments, the data option types available depend on the user. For example, law enforcement is able to select more data options than an insurance provider in some embodiments.

In some embodiments, the UI 110 includes a graphical user interface (GUI). In some embodiments, the UI 110 includes a mobile terminal, such as a mobile telephone, connectable to the server 120. In some embodiments, the UI 110 includes a web interface such as RESTful API. In some embodiments, the UI 110 includes a computer connectable to the server 120. In some embodiments, the UI 110 is capable of wireless connection to the server 120. In some embodiments, the UI is connectable to the server 120 by a wired connection. The UI 110 is also able to provide the user with updates regarding a status of a data request. In some embodiments, the UI 110 provides status updates regarding a data request in response to an additional query by the user. In some embodiments, the UI 110 provides status updates regarding a data request upon receipt of updated information from the server 120 automatically without user interaction. In some embodiments, the status update causes the UI 110 to trigger an alert for the user. In some embodiments, the alert includes an audio or visual alert.

In some embodiments, the UI 110 includes a means for accepting payment of a fee from the user. In some embodiments, the UI 110 includes data entry fields to permit the user to enter payment card information. In some embodiments, the UI 110 includes a reader for detecting payment card information, such as a magnetic stripe reader, a bar code reader, a chip reader, or another suitable reader.

The server 120 includes a communication section 130 configured to communicate with the UI 110 and the vehicle 140. The communication section 130 includes a receiver 131 configured to receive data requests from the UI 110. In some embodiments, the receiver 131 includes a wireless receiver. In some embodiments, the receiver is configured to receive the data requests via a wired connection. In some embodiments, the receiver 131 is further configured to perform initial processing on the received data request. In some embodiments, the received data request includes priority level information. In some embodiments, the receiver 131 is configured to assign a priority level to the data request based on an identity of the user that submitted the data request or a fee paid by the user that submitted the data request. In some embodiments, the receiver 131 is configured to assign a request identification (ID) number to each received data request. In some embodiments, the server 120 is configured to limit access to certain sensors within the vehicle 140 based on an identity the user. For example, a third-party user will not be able to access sensor related to safety functions of the vehicle 140 in some embodiments.

The communication section 130 further includes a memory unit 132 configured to store data requests received by the receiver 131. In some embodiments, the memory unit 132 includes a random access memory, a solid state memory, or another type of memory. In some embodiments, the memory unit 132 is configured to store the data requests along with a status of the data request. In some embodiments, the status of the data request includes pending (prior to transmission of the data request to the vehicle 140); submitted (following transmission of the data request to the vehicle 140); and completed (following receipt of the requested data from the vehicle 140). In some embodiments, the memory unit 132 is accessible by the user. In some embodiments, updates to information in the memory unit 132 trigger notifications of a user associated with the information updated in the memory unit 132. In some embodiments, the memory unit 132 stores data requests in conjunction with time stamp data indicating a time at which the data request was received. In some embodiments, the memory unit 132 stores data requests in association with a priority level. In some embodiments, the priority level is determined based on an identity of the user. For example, in some embodiments, law enforcement has higher priority than an insurance provider, which has higher priority than a normal user, such as a software developer. In some embodiments, the priority level is determined based on a fee paid by the user. For example, in some embodiments, a user is able to pay a fee in order to increase a priority level of their request in order to obtain the requested data sooner. In some embodiments, the priority level and fee amount is determined based on dynamic pricing. In some embodiments, the fee amount is directly proportional to the priority level. In some embodiments, the priority level and fee amount is determined based on individually set bids, ceilings, and resource availability analysis. In some embodiments, the priority level of a data request is increased as an amount of time between initial storage of the data request and transmission of the data request to the vehicle increases.

The communication section 130 further includes a transmitter 133. The transmitter 133 is configured to transmit a status of data requests to the UI 110. In some embodiments, the status of the data requests is wirelessly transmitted to the UI 110. In some embodiments, the status of the data requests is transmitted to the UI 110 via a wired connection, for example when the vehicle is connected at a dealership. In some embodiments, the transmitter 133 is configured to provide an update on a data request automatically in response to an update in the memory unit 132. In some embodiments, the transmitter 133 is configured to provide an update on a data request in response to a received update request from the user. In some embodiments, the transmitter 133 is configured to automatically transmit a request ID upon initially saving the data request in the memory unit 132. In some embodiments, the status of the data request includes a priority level of the data request. In some embodiments, the status of the data request includes an estimated time until the data request is transmitted to the vehicle 140.

The communication section 130 further includes a query queue 134 configured to store data requests in priority order for transmission to the vehicle 140. In some embodiments, the query queue 134 is integrated into the memory unit 132. In some embodiments, the query queue 134 is separate from the memory unit 132. In some embodiments, the query queue 134 is configured to retrieve data requests from the memory unit 132 based on priority level and time stamp information. In some embodiments, the query queue 134 is configured to order data requests based on priority level; and by time since initial saving in the memory unit 132 in response to data requests having a same priority level.

The communication section 130 further includes a transmitter 135 configured to transmit data requests to the vehicle 140 from the query queue 134. The transmitter 135 is configured to transmit the data requests to the vehicle 140 based on an order of the data requests in the query queue 134. In some embodiments, the data requests are transmitted to the vehicle 140 wirelessly. In some embodiments, the data requests are transmitted to the vehicle 140 by a wired connection. The data requests transmitted to the vehicle 140 include trigger event information, data duration information related to how long before and after the trigger event the data should be collected, and sensor information indicating a type of sensor of the vehicle 140 should collect the data. In some embodiments, the data requests transmitted to the vehicle 140 include priority level information. In some embodiments, the transmitter 135 is configured to transmit data requests to the vehicle 140 when the vehicle 140 sends a request to server 120 to transmit the data requests to the vehicle 140. In some embodiments, the transmitter 135 is configured to transmit data requests to the vehicle 140 any time the communication section 130 has sufficient connectivity to the vehicle 140 to transmit the data request unless the communication section 130 has received information indicating that the vehicle 140 is unable to accept a new data request. In some embodiments, the transmitter 135 is configured to transmit the data requests to the vehicle 140 periodically so long as the vehicle 140 is able to receive new data requests and the transmitter 135 has sufficient connectivity to the vehicle 140. In some embodiments, the transmitter 135 is configured to transmit the data requests to the vehicle 140 in batches, such as in groups of 5 data requests, 20 data requests or some other number of data requests. In some embodiments, the transmitter 135 is configured to request confirmation of receipt of the data request from the vehicle 140. In some embodiments, the transmitter 135 is configured to re-transmit the data request in response to failing to receive confirmation of receipt from the vehicle for a predetermined time period. In some embodiments, the status of the data request stored in the memory unit 132 is updated to indicate submission to the vehicle 140 in response to the communication section 130 receiving confirmation of receipt of the data request from the vehicle 140.

The communication section 130 further includes a receiver 136 configured to receive notification of the occurrence of trigger events from the vehicle 140. In some embodiments, the occurrence of a trigger event is receipt of a data request. In some embodiments, the receiver 136 is configured to receive the notification of the trigger events wirelessly. In some embodiments, the receiver 136 is configured to receive the notification of the trigger events via a wired connection. In some embodiments, the receiver 136 is configured to send a signal to the memory unit 132 to update a status of a data request related to the notified trigger event.

The communication section 130 further includes a receiver 137 configured to receive data from the vehicle 140 responsive to the data requests transmitted by the transmitter 135. In some embodiments, the data is split by the vehicle 140 into data packets that is the unit of transmission from the vehicle 140 to the server 120, and the receiver 137 receives the data packet from the vehicle 140. In some embodiments, the receiver 137 is configured to receive the data wirelessly. In some embodiments, the receiver 137 is configured to receive the data via a wired connection. In some embodiments, the receiver 137 is configured to send a signal to the memory unit 132 to update a status of a data request related to the receipt of requested data. In some embodiments, the data responsive a single data request is received in a single packet from the vehicle 140. In some embodiments, the data responsive to a single data request is received in multiple packets from the vehicle 140. The receiver 137 transfers the received data to a pre-processor 122.

The server 120 further includes the pre-processor 122 configured to receive data from the receiver 137 and perform pre-processing on the data to generate collected data. In some embodiments, the pre-processing includes reforming of data from multiple packets to compile data responsive to a data request. In some embodiments, the pre-processing includes de-serializing of data to compile structured data from a byte array that is received. In some embodiments, the pre-processing includes de-compressing of data if the data is compressed by the vehicle 140 before sending. In some embodiments, the pre-processing includes error correction by Error Correction Code (ECC) such as Reed-Solomon (RS) Code, Bose-Chaudhuri-Hocquenghem (BCH) code, Low-density parity-check (LDPC) code and the like. In some embodiments, the pre-processing includes smoothing of data by removing outlier values to reduce a risk of report incorrect data to the user. In some embodiments, the pre-processing includes associating data request ID information, priority level information or other suitable information with the received data from the receiver 137. In some embodiments, the pre-processing includes aggregating query results from one or more vehicles. In some embodiments, the pre-processing includes one or more processes offloaded from a server. In some embodiments, the data is pre-processed so that the information is provided to the user in a format that is easy to understand and does not rely on specialized knowledge or equipment to discern the information.

The server 120 further includes a data storage 126 configured to store the collected data generated by the data pre-processor 122. In some embodiments, the data storage 126 is integrated with the memory unit 132. In some embodiments, the data storage 126 is separate from the memory unit 132. In some embodiments, the data storage 126 includes a solid state drive (SSD), a random access memory or another suitable memory. In some embodiments, the data storage 126 is accessible by the user, e.g., using the UI 110 or an accessible console 150. In some embodiments, the data storage 126 is configured to notify the user in response to data related to a data request is available. In some embodiments, the notification includes an alert to the user. In some embodiments, the alert includes an audio or visual alert. In some embodiments, the data storage 126 is configured to cause the UI 110 or the accessible console 150 to automatically display the notification of an availability of the collected data. In some embodiments, the data storage 126 is accessible by a user using the accessible console 150 without the user submitting a data request. In some embodiments, the data within the data storage 126 are searchable by the user via the accessible console 150. In some embodiments, the collected data is visualized in the console 150.

The request retrieval system 100 further includes a vehicle 140. The vehicle 140 includes sensors to detect both an internal status of the vehicle 140 as well as an external environment surrounding the vehicle 140. In some embodiments, the sensors include a camera, a light distance and ranging (LiDAR) sensor, a radio distance and ranging (RADAR) sensor, a sound navigation and ranging (SONAR) sensor, an accelerometer, a steering wheel position, a speedometer, or another suitable sensor. The vehicle 140 is capable of receiving data requests, either wirelessly or via a wired connection.

In some embodiments, in response to receiving the data request, the vehicle 140 is configured to assign a data request ID to the received data request and the data request is processed to be agnostic to an originating system or program of the data request. In another embodiments, the communication section 130 instead of the vehicle 140 assigns the data request ID, and the data request ID is included in the data request that is sent from the communication section 130 to the vehicle 140. Making the data request agnostic to the originating system or program of the data request helps with expanding an ability of the vehicle 140 to receive and process a wide range of data requests from different users and systems. The vehicle 140 includes a processor for processing the data requests and determining what type of information from which sensors available in the vehicle 140 are capable of satisfying the data request. In at least some embodiments, the vehicle 140 includes a mobile computing network, which is a network of processors, controllers, or a combination thereof, such as a Controller Area Network (CAN). In at least some embodiments, each processor is an Electronic Control Unit (ECU). In at least some embodiments, Microcontroller Units (MCUs) are present. The vehicle 140 further includes a memory for storing data from the sensors. In some embodiments, the processor accesses the memory to determine whether any stored data is capable of satisfying the data request. The vehicle 140 is further capable of transmitting the data deemed to satisfy the data request to the server 120 either wirelessly or via a wired connection. In some embodiments, the processor is configured to attempt to satisfy received data requests in a priority order based on a received priority level of the data request. In some embodiments, the vehicle 140 is configured to transmit data to the server preferentially based on the received priority level of the data request.

In some embodiments, the memory and the processor of the vehicle 140 are configured to store and execute software applications in an electronic control unit (ECU) within the vehicle 140. In some embodiments, a data request is generated by the software application stored in the ECU. In some embodiments, the data request is generated in response to a trigger event, such as sudden acceleration, sudden braking, capturing sensor data including specific objects or specific scenes that are predefined in the software application, "crashing" of the software application, a detected abnormality in the software application, or another suitable detected occurrence. In some embodiments, the vehicle 140 is configured to generate a notification to a maintainer, e.g., the user, of the software application in response to detecting a trigger event associated with the software application. In some embodiments, the notification is transmitted, either wirelessly or through a wired connection, directly to the user, e.g., through the UI 110. In some embodiments, the notification is transmitted, either wirelessly or through a wired connection, to the user through the server 120. In some embodiments, the notification includes an audio or visual notification. In some embodiments, the notification is configured to cause the UI 110 to automatically display the notification without user interaction.

The request retrieval system 100 further includes an accessible console 150. The accessible console 150 permits the user to access the collected data stored in the data storage 126. In some embodiments, the accessible console 150 is integrated with the UI 110. In some embodiments, the accessible console 150 is separate from the UI 110. In some embodiments, the accessible console 150 includes another server separate from the server 120. In some embodiments, the accessible console 150 automatically receives collected data related to a data request from the user upon receipt of the collected data by the data storage 126. In some embodiments, the accessible console 150 permits the user to search the data storage 126 to determine whether any of the collected data stored in the data storage 126 are useful to the user without the user submitting a data request.

Using the request retrieval system 100 permits users to obtain information from one or more vehicles 140 in a format that is easy to understand without relying on specialized equipment to request or read the received data. The ability to prioritize data requests in the request retrieval system 100 help to ensure that law enforcement or other user is able to obtain data, while also permitting users to pay a fee to obtain data faster. This flexibility helps to improve the usefulness of the request retrieval system 100 for a wide range of users.

Figure 2:
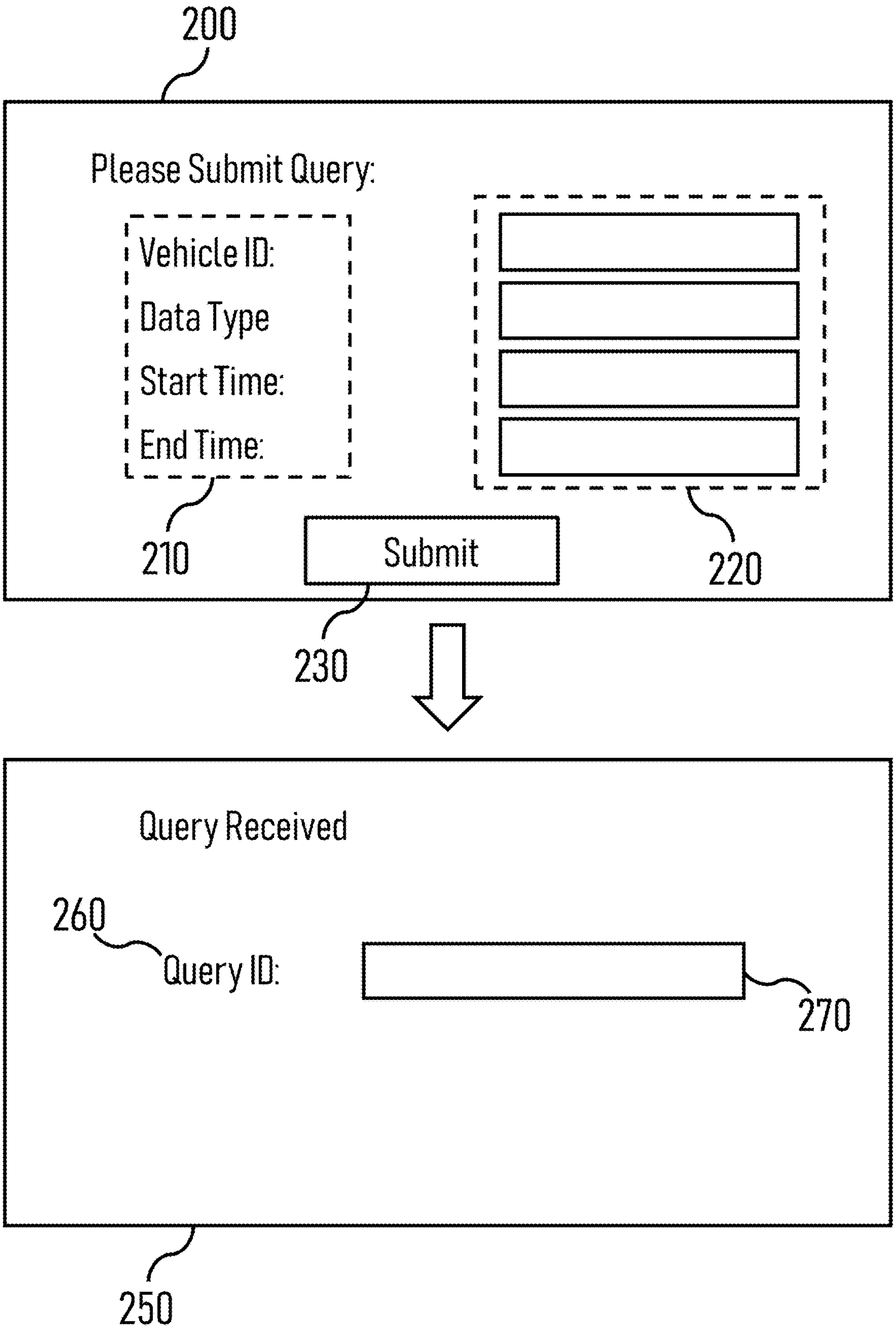
FIG. 2 is views of a graphical user interface (GUI) for mobile computing network content query in accordance with at least some embodiments of the subject disclosure.

FIG. 2 is views of a graphical user interface (GUI) 200 and 250 for request retrieval system in accordance with some embodiments. In some embodiments, the GUI 200 is usable as UI 110 in request retrieval system 100 (FIG. 1). In some embodiments, the GUI 200 is usable to generate a data request for receipt by the receiver 131 (FIG. 1). The GUI 200 includes a plurality of information types 210 which identify a type of information that the GUI 200 is able to accept from the user. The GUI 200 further includes a plurality of fields 220 configured to receive information related to a corresponding information type 210 of the GUI 200. The GUI 200 further includes a submit button 230 configured to submit a data request to a server, e.g., server 120 (FIG. 1), based on the information in the fields 220. One of ordinary skill in the art would recognize that the names and number of the plurality of information types 210 is merely exemplary and that different numbers and types of information are also within the scope of this disclosure.

In some embodiments, the fields 220 includes fields for users to enter the vehicle ID, the data type, the start time and the end time. In some embodiments, the field 220 further includes a field for users to enter a priority level of the data request. In some embodiments, the GUI 200 further includes information related to how a user is able to increase a priority level of a data request, such as indicating a fee associated with each available priority level. In some embodiments, the GUI 200 includes fields 220 for allowing a user to enter log in information to establish an identity of the user. In some embodiments, the GUI 200 is configured to display a priority level of the user following receiving log in information. In some embodiments, the GUI 200 further includes fields 220 for receiving payment information related to fees for establishing a priority level of a data request. In some embodiments, the fields 220 include fields for entry of a query language, such as SQL. In some embodiments, the GUI 200 is configured to display sampled data, enabling query trial and planning, utilizing real or manufactured samples. In some embodiments, the GUI 200 is configured to utilize a "REPL", such as SciPy/NumPy/Matplotlib or R, or a console, such as Jupyter notebook.

The GUI 250 is configured to be displayed to the user after the user has selected the submit button 230 on GUI 200. In some embodiments, the GUI 250 is usable as the GUI 110 in the ODDR system 100 (FIG. 1). The GUI 250 includes information indicating that the data request has been received. The GUI 250 includes a query ID label 260 and a query ID field 270. Information for populating the query ID field 270 is received from a server, e.g., server 120 (FIG. 1), following the server receiving and storing the data request. In some embodiments, the GUI 250 includes information of the vehicle ID. In some embodiments, the GUI 250 includes information related to a priority level of the data request. In some embodiments, the GUI 250 includes information regarding a status of the data request, such as pending, submitted, completed, etc. In some embodiments, the GUI 250 includes information related to an estimated time until the data request is submitted to a vehicle, e.g., vehicle 140 (FIG. 1). In at least some embodiments, the GUI 250 includes information related to an estimated time until the requested data is received. In at least some embodiments, the GUI 250 includes information related to an estimated energy expenditure to receive the requested data. In some embodiments, the GUI 250 is displayed automatically in response to receipt of query ID information from the server. In some embodiments, the GUI 250 is displayed in response to a user submitting a request for an update on an uploaded data request.

Figure 3:
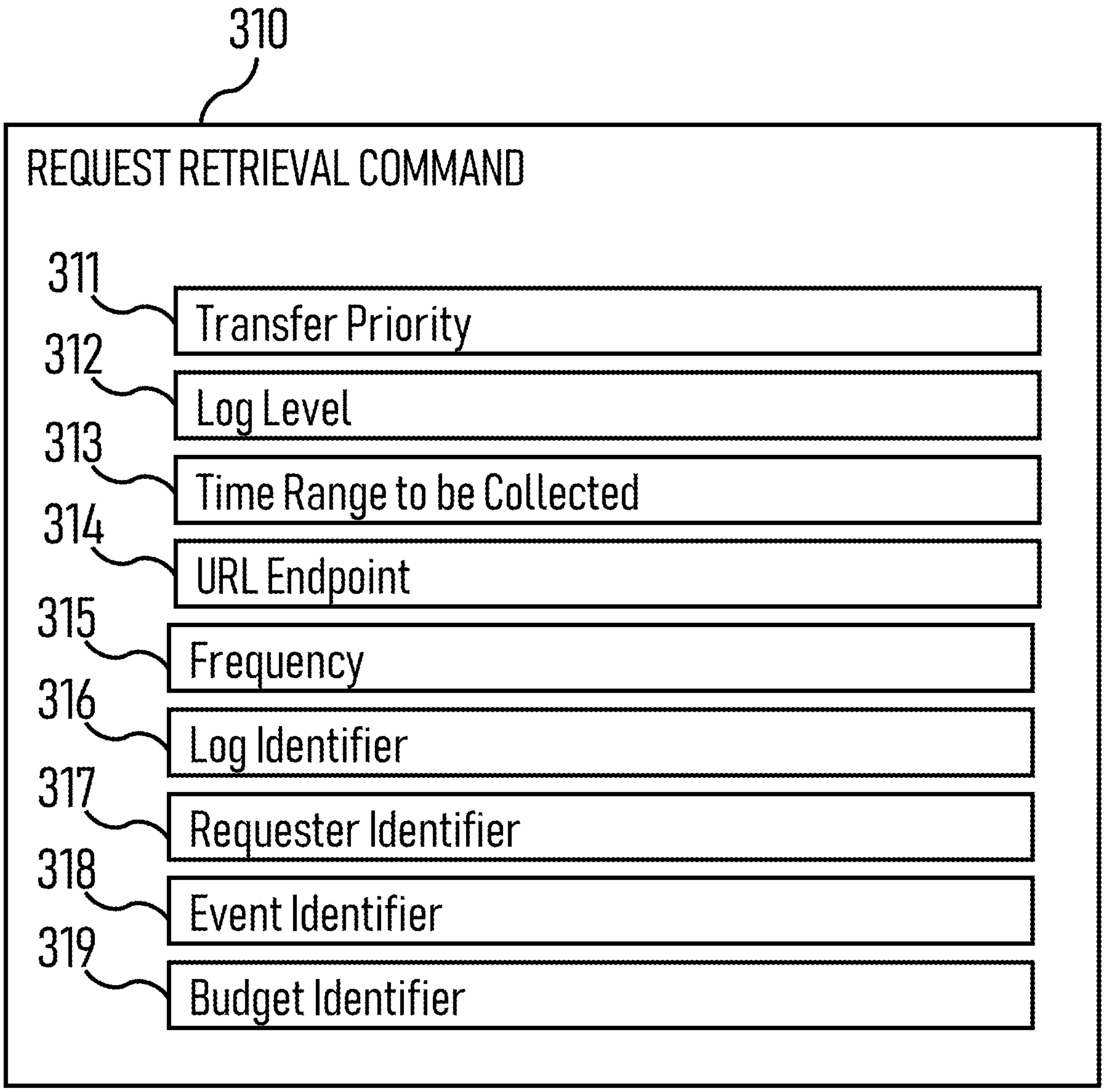
FIG. 3 is a diagram of a data structure of a content retrieval task in accordance with at least some embodiments of the subject disclosure.

FIG. 3 is a diagram of a data structure 300 of a request retrieval command 310 in accordance with some embodiments. In some embodiments, the request retrieval command 310 is transmitted from the server 120 to the vehicle 140 (FIG. 1). The request retrieval command 310 includes information related to a type of data sought by a data request to a vehicle, e.g., vehicle 140 (FIG. 1).

The request retrieval command 310 includes a transfer priority parameter 311 that indicates a priority level of the data request. The request retrieval command 310 further includes a log level parameter 312 that indicates what type of data, if any, should be retrieved from other applications on the vehicle. For example, in some embodiments, the request retrieval command 310 retrieves data from an object recognition application. The log level parameter 312 determines what type of data to retrieve from the other application, such as error level or critical level In some embodiments, the log level parameter 312 is omitted from the request retrieval command 310 or the log level parameter 312 is left in a null state. The request retrieval command 310 further includes a time range to be collected parameter 313 that indicates a time period before and/or after a trigger event to collect data. In some embodiments, the time range is corresponding to the start time and the end time that was entered in GUI 200 (FIG. 2) by the users. The request retrieval command 310 further includes a uniform resource locator (URL) endpoint parameter 314 that indicates a destination for the data collected in response to the data request. The request retrieval command 310 further includes a frequency parameter 315 that indicates how often, if ever, the data should be sampled from the time range 313. For example, when the event time is t=100 sec, the time range comprises start time=−1 sec and end time=2 sec and the frequency is 10 Hz (100 msec cycle), then the data at t=99.0 sec, 99.1 sec, 99.2 sec, . . . , 101.9 sec, 102.0 sec is collected by the request retrieval command. The request retrieval command 310 further includes a log ID parameter 316 that indicates types of sensors and/or applications usable to collect the data requested by the data request. In some embodiments, unique IDs (such as Universally unique identifier (UUID)) are pre-assigned to all the sensors and applications, and the unique IDs which the user want to collect data from is specified in the log ID parameter 316. The request retrieval command 310 further includes a requester ID parameter 317 that indicates an identity of the user that made the data request. The request retrieval command 310 further includes an event ID parameter 318 that indicates a trigger event associated with the data request. The request retrieval command 310 further includes a budget ID parameter 319 that indicates how much of the resources of the vehicle, e.g., vehicle 140 (FIG. 1), should be allocated to satisfying the data request. One of ordinary skill in the art would understand that additional parameters are possible in the request retrieval command 310. For example, in some embodiments, the request retrieval command 310 includes vehicle location parameter that indicates a geographic area where the trigger event is capable of occurring. One of ordinary skill in the art would also understand that the request retrieval command 310 does not always include all of the parameters in FIG. 3. For example, in some embodiments, the budget ID parameter 319 is omitted.

Figure 4:
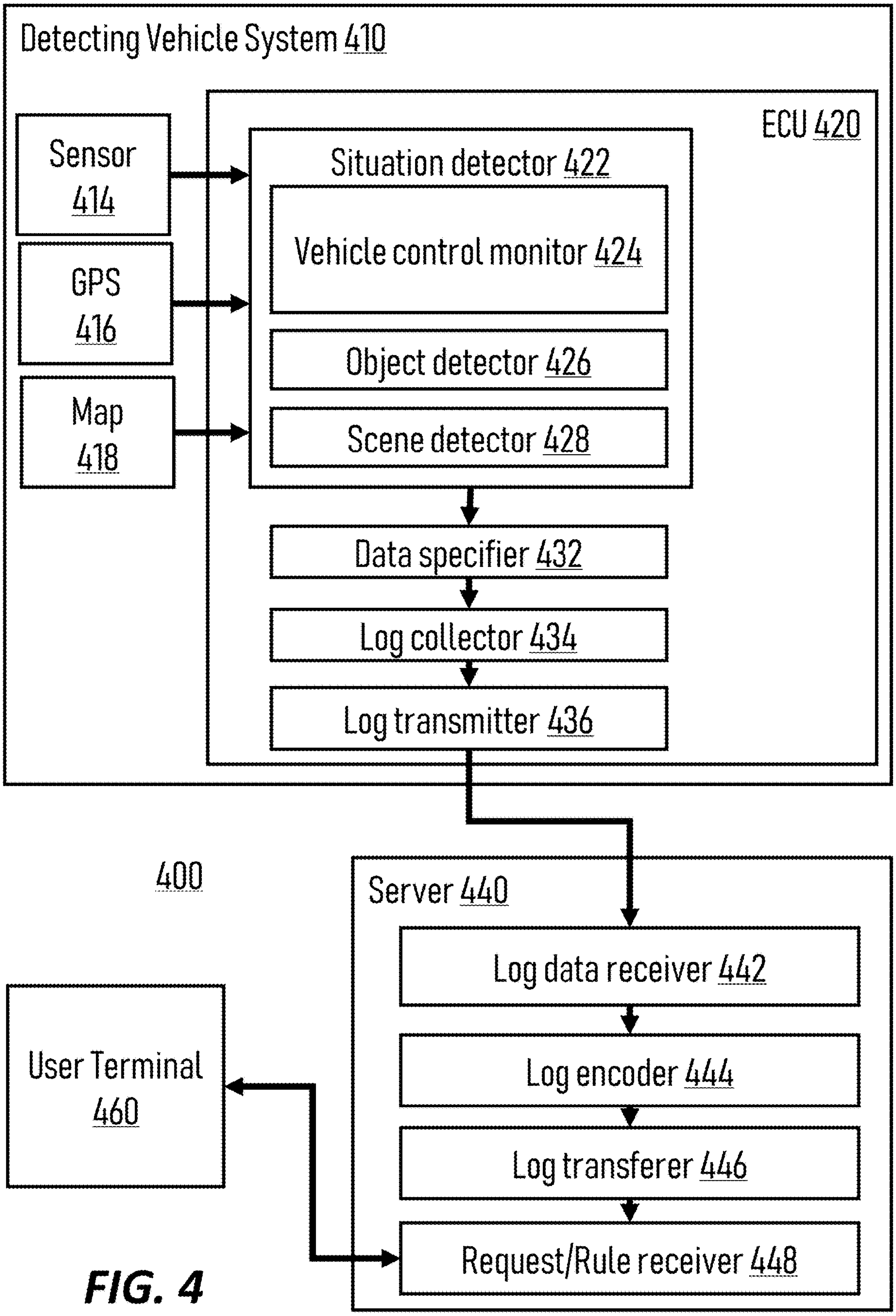
FIG. 4 is a schematic diagram of a queried content retrieval system in accordance with at least some embodiments of the subject disclosure.

FIG. 4 is a block diagram of a request retrieval system 400, in accordance with some embodiments. In some embodiments, the request retrieval system 400 is part of the request retrieval system 100 (FIG. 1). In some embodiments, the request retrieval system 400 is usable in conjunction with the request retrieval system 100 (FIG. 1). In some embodiments, the request retrieval system 400 is separate from the request retrieval system 100 (FIG. 1).

The request retrieval system 400 includes a detecting vehicle system 410 configured to capture information about a vehicle or surroundings of the vehicle. The detecting vehicle system 110 captures information about the vehicle and the surroundings and transmits the information to a server. The request retrieval system 400 further includes a server 440 configured to receive the information, encode the information, and disseminate the information to a user terminal 460.

The detecting vehicle system 410 includes an electronic control unit (ECU) 420 configured to receive data from a sensor 414, a global positioning system (GPS) 416 and a map 418. The ECU 420 includes a situation detector 422, a data specifier 432, a log collector 434 and a log transmitter 436. The situation detector 422 includes a vehicle control monitor 424, an object detector 426, and a scene detector 428.

In some embodiments, the ECU 420 further includes a localization unit configured to receive data from the GPS 416 and the map 418 and determine a position of the vehicle and a pose and state of the vehicle relative to detected and/or known objects and/or road position. A pose is an orientation of the vehicle relative to a reference point, such as a roadway. In some embodiments, the position of the vehicle also refers to a position vector of the vehicle. The pose and state of the vehicle refers to a speed and a heading of the vehicle. In some embodiments, the pose and state of the vehicle also refers to a velocity vector, an acceleration vector and jerk vector of the vehicle. In some embodiments, the position vector, the velocity vector, the acceleration vector, and the jerk vector include angle vector. In some embodiments, the state of the vehicle also refers to whether an engine or motor of the vehicle is running.

The sensor 414 is configured to capture information, such as images, of an environment surrounding the vehicle. In some embodiments, the sensor 414 includes a visible light camera, an IR camera. In some embodiments, the sensor 414 is replaced with or is further accompanied by a light detection and ranging (LiDAR) sensor, a radio detection and ranging (RADAR) sensor, a sound navigation and ranging (SONAR) sensor or another suitable sensor. In some embodiments, the sensor 414 includes additional cameras located at other locations on the vehicle. For example, in some embodiments, additional cameras are located on sides of the vehicle in order to detect a larger portion of the environment to the left and right of the viewing vehicle. Since vehicle occupants are able to look out of side windows of the vehicle, using additional cameras to detect a larger portion of the environment surrounding the vehicle helps to increase precision of detecting objects or scenes surrounding the vehicle. For example, in some embodiments, additional cameras are located on a back side of the vehicle in order to detect a larger portion of the environment to a rear of the vehicle. This information helps to capture information about objects. In some embodiments, the data from the sensor 414 includes a timestamp or other metadata in order to help synchronize the data from the sensor 414 with the data from other components.

The GPS 416 is configured to determine a location of the vehicle. Knowing the location of the viewing vehicle helps to relate an object or scene with determined locations on the map 418.

The map 418 includes information related to the roadway and known objects along the roadway. In some embodiments, the map 418 is usable in conjunction with the GPS 416 to determine a location and a heading of the vehicle. In some embodiments, the map 418 is received from an external device, such as the server 440. In some embodiments, the map 418 is periodically updated based on information from the sensor 414 and/or the GPS 416. In some embodiments, the map 418 is periodically updated based on information received from the external device. In some embodiments, the map 418 is generated from sensor data by simultaneous localization and mapping (SLAM) algorithm. Including the map 418 helps to determine whether an object is a known object. Including the map 118 having known objects helps to increase precision of new object detection.

The situation detector 422 is configured to generate information related to performance of the vehicle and of systems within the vehicle. The situation detector 422 is able to collect information from components within the vehicle, such as the sensor 414, braking systems, acceleration system, and other suitable components. Utilizing this information, the situation detector 422 is able to determine performance of the vehicle. In some embodiments, the situation detector 422 is further configured to monitor performance of software and networking operations within the vehicle. For example, in some embodiments, the situation detector 422 is configured to receive information related to "crashing" of software or applications within the vehicle. In some embodiments, the situation detector 422 is configured to collect information regarding a storage capacity of a memory device within the vehicle. In some embodiments, the situation detector 422 is configured to receive information related to a processing capability of a processor within the vehicle.

The vehicle control monitor 424 is configured to receive sensor data and control logs related to current operation of the vehicle. In some embodiments, the sensor data includes information related to vehicle speed, acceleration, jerk, braking, steering, pitching, rolling, yawing, blinking hazard lamp, horn beeping, or other suitable information. The vehicle control monitor 424 is configured to determine whether any of the received sensor data indicates the satisfaction of a criteria for fulfilling a request, e.g., a trigger event was detected.

The object detector 426 is configured to receive sensor data from the sensor 414 to determine whether any abnormal objects are located in the roadway. In some embodiments, the object detector 426 is further configured to determine whether any objects are present along or adjacent to the roadway. In some embodiments, the sensor data from the sensor 414 includes an image and the object detector 426 is configured to perform image recognition on the received image, e.g., using a trained neural network, to identify abnormal objects. In some embodiments, the object detector 426 is configured to compare any identified objects with information from the GPS 416 and the map 418 to help determine a type of an identified object. In some embodiments, the object detector 426 is configured to identify objects, e.g., a tire, a car part, etc., an animal, a pothole, a traffic regulation board, an emergency vehicle, a vehicle with hazard lights active, or other suitable objects as objects.

The scene detector 428 is configured to receive the sensor data from the sensor 414 to determine whether any scenes are located in an environment surrounding the vehicle that satisfy a condition for fulfilling a request. In some embodiments, the scene detector 428 is configured to determine that a vehicle accident has occurred in response to detecting that two or more vehicles are in contact with one another or that a vehicle is surrounded by multiple fallen objects. In some embodiments, the scene detector 428 is configured to determine that construction is occurring based on detecting multiple construction vehicles in close proximity. In some embodiments, the scene detector 428 is configured to determine that a vehicle is parked on a shoulder of the roadway based on determining that a vehicle is located adjacent to the roadway and is not moving or is moving significantly slower than other vehicles. In some embodiments, the scene detector 428 is configured to use image recognition, such as through a trained neural network, to determine contents of a scene surrounding the vehicle.

In some embodiments, each of the object detector 426 and the scene detector 428 are active during an entire period of operation of the vehicle, e.g., when an engine or motor of the vehicle is running. In some embodiments, at least one of the object detector 426 or the scene detector 428 is activated in response to the vehicle control monitor 424 determining that a specific behavior, e.g., trigger event, was detected.

The data specifier 432 is configured to receive a determination that a fulfillment of a request was performed or that a trigger event was detected. The data specifier 432 is configured to analyze the received information to determine what sensor data from the sensor 414 should be collected based on the received data. For example, in some embodiments where an abnormal steering behavior by the driver is detected, the data specifier 432 is configured to determine that image data from a front camera of the sensor 414 should be captured. Further, the data specifier 432 is configured to determine a time period over which the data from the determine sensor should be collected based on a time of the detected situation. In some embodiments, the data specifier 432 is configured to determine the sensor 414 from which to collect data based on instructions in a received request from user.

In some embodiments, the data specifier 432 is configured to determine a region of the received sensor data that is relevant to the detected situation. In some embodiments, the region of the received sensor data is identified based on object recognition performed on the sensor data, e.g., by the object detector 426 or the scene detector 428. In some embodiments, the data specifier 432 is configured to crop a received image from the sensor data or remove extraneous data from the sensor data if the sensor data is not an image to reduce an amount of information in a log of the abnormal situation. In some embodiments, the data specifier 432 is configured to remove personal information such as license plate, human faces, etc. from the sensor data.

The log collector 434 is configured to receive data from the data specifier 432. In some embodiments, the log collector 434 is configured to receive data directly from the sensor 414, the GPS 416, or the situation detector 422 based on information provided by the data specifier 432. The log collector 434 is also configured to determine what information is useful for identifying the type and location of the object, such as location information from the GPS 416 or the map 418, image information from the sensor 414, cropped or reduced information from the data specifier 432, timestamp information related to a time the object or scene was detected, or other suitable information.

The log collector 434 generates log data based on the received and correlated data, such as the cropped image and location data. The log collector 434 also associates timestamp information with the log data in order to assist with synchronization of the collected data and for queue priority within the server 440. In some embodiments, the log collector 434 generates the log data to further include world coordinates associated with the cropped image. In some embodiments, the log collector 434 generates the log data to further include a map location associated with the cropped image. In some embodiments, the log collector 434 includes additional information to assist in increasing accuracy of determining the object or scene.

While the above description relates to generating log data based on an image from the sensor 414, one of ordinary skill in the art would understand that the log collector 434 is not limited solely to generating log data based on images. In some embodiments, the log collector 434 is configured to generate log data based on information from other sensors attached to the vehicle, such as RADAR, LiDAR, or other suitable sensors. In some embodiments where the occupant is wearing smart glasses, the log collector 434 is further configured to generate the log data based on information received from the smart glasses.

The log transmitter 436 is configured to receive log data from the log collector 434 and transmit the log data to the server 440. In some embodiments, the log transmitter 436 is configured to transmit the log data wirelessly. In some embodiments, the log transmitter 436 is configured to transmit the log data via a wired connection. In some embodiments, the log transmitter 436 is configured to transmit the log data to the user terminal 460 directly. In some embodiments, the log transmitter 436 is configured to transmit the log data to a mobile device accessible by the user, which in turn is configured to transmit the log data to the server 440. In some embodiments, the log transmitter 436 is configured to transmit the log data to the mobile device using Bluetooth® or another suitable wireless technology. In some embodiments, the ECU 420 is configured to determine whether the data transfer rate from the mobile device to the server 440 is higher than a transfer rate from the log transmitter 436 to the server 440. In response to a determination that the data transfer rate from the mobile device to the server 440 is higher, the log transmitter 436 is configured to transmit the log data to the mobile device to be transmitted to the server 440. In response to a determination that the data transfer rate from the mobile device to the server 440 is not higher, the log transmitter 436 is configured to transmit the log data to the server 440 from the vehicle system 410 directly without transferring the log data to the mobile device.

In some embodiments, the detecting vehicle system 410 further includes a memory configured to store sensor data from sensors attached to the vehicle. In some embodiments, the memory is further configured to store information associated with previously detected objects or scenes. In some embodiments, in response to detecting an object or scene that matches a previous object or scene, the data specifier 434 is configured to provide results based on the matching object or scene. In some embodiments, the detecting vehicle system 410 is further configured to determine whether the detecting vehicle has received from the server 440 information related to an object or scene that matches the determined object or scene from the situation detector 422. In some embodiments, in response to determining that the detecting vehicle has already received information related to the determined object or scene, the detecting vehicle system 410 is configured to prevent transmission of the log data to the server 440. Avoiding transmission of redundant information to the server 440 helps to reduce data transmitted to the server 440 and helps to minimize power consumption by the detecting vehicle system 410. In some embodiment, the storing of the previous requests is called caching. One of ordinary skill in the art would understand caching as using hardware or software to store data so that future requests for that data are able to be served faster.

The server 440 includes a log data receiver 442 configured to receive the log data from the log transmitter 436. In some embodiments, the log data receiver 442 is configured to receive the log data from the mobile device. The server 440 further includes a log encoder 444 configured to encode the log data. The server 440 further includes a log transferrer 446 configured to transmit the encoded log data to the user terminal 160. The server 440 further includes a request/rule receiver 448 configured to receive a request or a rule from the user terminal 460.

The log data receiver 442 is configured to receive the log data from the log transmitter 436. In some embodiments, the log data receiver 442 is configured to receive the log data from the mobile device. In some embodiments, the log data receiver 442 is configured to receive the log data wirelessly. In some embodiments, the log data receiver 442 is configured to receive the log data via a wired connection. In some embodiments, the log data receiver 442 is configured to attach a timestamp for a time that the log data was received to the log data.

The log encoder 444 is configured to encode the received log data according to a predetermined encoding protocol. Encoding the log data according to a predetermined encoding protocol helps to ensure that the user terminal 460 is able to reliably decode the log data for use by the user terminal 460. In some embodiments, the log encoder 444 is configured to perform compression of the log data, image encoding, thumbnail image creation, or other suitable encoding protocols. In some embodiments, the log encoder 444 is configured to perform encryption of the log data. In some embodiments, the log encoder 444 is further configured to perform super-resolution to make the data more visible for the user. One of ordinary skill in the art would understand that super-resolution is a process of receiving a high-resolution image from a low-resolution image. Improving the resolution of the log data helps to reduce false positives or false negatives.

In some embodiments, the server 440 further includes a database for storing received log data. In some embodiments, the log data is stored in the database prior to and/or after encoding by the log encoder 444. In some embodiments, the log data is stored in the database in a priority queue. In some embodiments, the priority of the priority queue is determined based on a time that the object or scene, e.g., a trigger event, was detected, a time that the log data was received by the log data receiver 442, a type of the object or scene, an identity of the driver of the detecting vehicle, or other suitable priority criteria.

The log transferer 446 is configured to receive the encoded log data from the log encoder 444. The log transferer 446 is configured to transmit the encoded to the user terminal 460. In some embodiments, the log transferer 446 is configured to transmit the encoded log data to a mobile device accessible by the user. In some embodiments, the log transferer 446 is configured to transfer the encoded log data wirelessly. In some embodiments, the log transferer 446 is configured to transmit the encoded log data via a wired connection. In some embodiments, the log transferer 446 is configured to transmit encoding protocol information along with the encoded log data. Transmitting the encoding protocol information for the encoded log data helps the mobile device or the user terminal 460 to accurately decode the encoded log data for use by the user terminal 460.

The request/rule receiver 448 is configured to receive new or updated rules or requests for data from a user. In some embodiments, the request/rule receiver 448 is configured to receive the new or updated rules or requests wirelessly. In some embodiments, the request/rule receiver 448 is configured to receive the new or updated rules or request via a wired connection. In some embodiments, the request/rule receiver 448 from the UI 110 (FIG. 1).

In some embodiments, the server 440 is configured to receive location in formation from multiple vehicles. In some embodiments, the server 440 is configured to receive navigation plans from multiple vehicles. In some embodiments, the log transferer 446 is configured to limit the transmission of encoded log data to only vehicles that are within a predetermined distance of the detected trigger event.

In some embodiments, the server 440 is configured to transmit only log data associated with a newly detected trigger event. That is, if the trigger event has already been reported by the server 440, the trigger event is not reported again. Limiting the repetitive reporting of trigger event helps to reduce redundant data received by user terminals to the server 440.

The user terminal 460 is a user terminal accessible by a user associated with a fulfilled request. In some embodiments, the user terminal 460 includes a GUI. In some embodiments, the user terminal 460 is configured to automatically generate an alert in response to received data from the server 440. In some embodiments, the alert includes an audio or visual alert.

One of ordinary skill in the art would understand that modifications to the request retrieval system 400 are within the scope of this disclosure. For example, in some embodiments, the detecting vehicle system 410 is able to transmit log data directly to the user terminal 460 over a network, such as a wireless network. In some embodiments, a mobile device of an occupant in the detecting vehicle is able to transmit log data directly to the user terminal 460, such as a wireless network.

By automatically identifying and disseminating information related to satisfaction of rule or requests detected within the vehicle or in an environment surrounding a vehicle, the user is able to improve performance of applications or software executed using a processing system of the vehicle, e.g., the ECU 420. In some embodiments, the user is able to object information related to events such as accidents.

Figure 5:
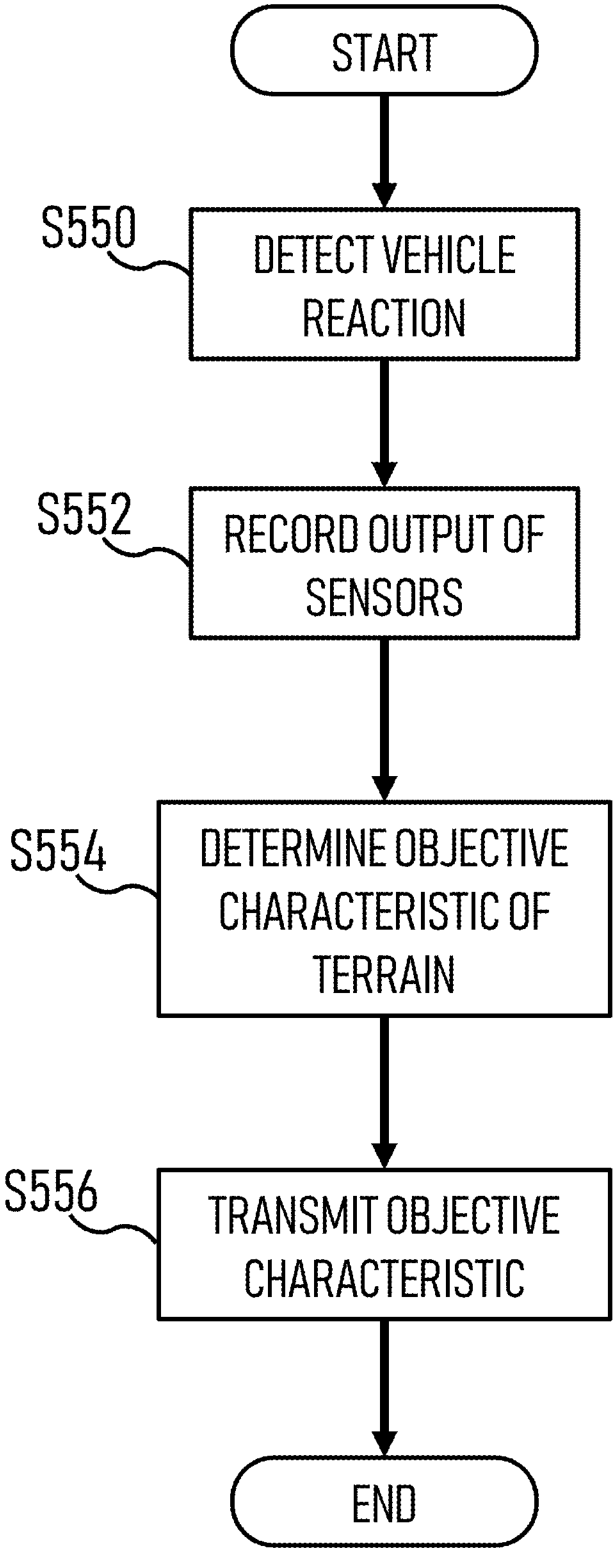
FIG. 5 is an operational flow for vehicle recording based terrain objective characteristic determination in accordance with at least some embodiments of the subject disclosure.

FIG. 5 is an operational flow for vehicle recording based terrain objective characteristic determination in accordance with at least some embodiments of the subject disclosure. The operational flow provides a method of vehicle event recording based terrain objective characteristic determination. In at least some embodiments, the method is performed by a vehicle, such as vehicle 140 shown in FIG. 1 or detecting vehicle system 410 shown in FIG. 4. In at least some embodiments, the method is performed by a controller of the detecting vehicle system, such as ECU 420 shown in FIG. 4 or controller 802 shown in FIG. 8.

At S550, a detecting section of the controller detects a vehicle reaction. In at least some embodiments, the detecting section detects a vehicle reaction of a vehicle, the vehicle reaction triggered by a threshold reading of at least one triggering sensor of the vehicle. In at least some embodiments, the threshold reading is based on Operational Design Domain (ODD). In at least some embodiments, when the vehicle approaches the ODD limits of the at least one triggering sensor, a vehicle action will be triggered, for example, a safety mechanism, ABS, airbags, etc. In at least some embodiments, existing triggers can be utilized as the basis for recording events. Additionally, in at least some embodiments, a specific query from a programmer can be used as a trigger. In at least some embodiments, programmers can specify individual sensors for recording and not recording in response to programmer-defined recording triggers. In at least some embodiments, the detecting section adjusts the threshold reading based on an amount of available storage. In at least some embodiments, the detecting section performs the operations shown in FIG. 6, which will be explained hereinafter.

At S552, a recording section of the controller records output of sensors. In at least some embodiments, the recording section records an output of the at least one triggering sensor and at least one related sensor of the vehicle in response to detecting the vehicle reaction. In at least some embodiments, the at least one related sensor comprises a GPS sensor. In at least some embodiments, the related sensor includes one or more of a sensor detecting gear ratio, such as in the event of a vehicle reaction triggered by wheel slippage, a temperature sensor, a rain detection sensor, a snow detection sensor, a speed sensor, a tire wear estimate sensor, a GPS sensor, a driver-view camera, etc. In at least some embodiments, the recording section performs the operational flow of FIG. 7, which will be described hereinafter.

At S554, a determining section of the controller determines an objective characteristic of a terrain. In at least some embodiments, the determining section determines an objective characteristic of a terrain based on the recorded output of each the at least one triggering sensor, the recorded output of the at least one related sensor, and at least one characteristic of the vehicle. In at least some embodiments, the at least one characteristic of the vehicle comprises at least one of a static characteristic based on make and model of the vehicle or a dynamic characteristic of the vehicle at a time of the recording. In at least some embodiments, the recorded information of the event is analyzed to normalize the conditions with respect to the vehicle characteristics, including static characteristics, such as vehicle weight, ground clearance, gear ratios, drive train, etc., dynamic characteristics, such as load weight, tire pressure, current gear, current speed, etc., or both. In at least some embodiments, for example, if a ground clearance sensor detects the terrain reaching 80% of clearance, 80% is converted into an actual height by comparing 80% to the known maximum clearance height for the model of the vehicle. This will effectively reveal an objective characteristic of the terrain independent of the instant vehicle recording the event. In at least some embodiments, for example, the information may reveal that the terrain is a frozen road by considering temperature and rain or snow detection in the event of a vehicle reaction triggered by wheel slippage. In at least some embodiments, the revealed information about the terrain itself can be utilized even with just one instance. However, in at least some embodiments, the revealed information about the terrain itself can be improved by aggregating events recorded from many vehicles in the same geographic location.

At S556, the transmitting section of the controller transmits the objective characteristic. In at least some embodiments, the transmitting section transmits the objective characteristic to a server through a network. In at least some embodiments, the transmitting section transmits the objective characteristic directly to another vehicle.

Figure 6:
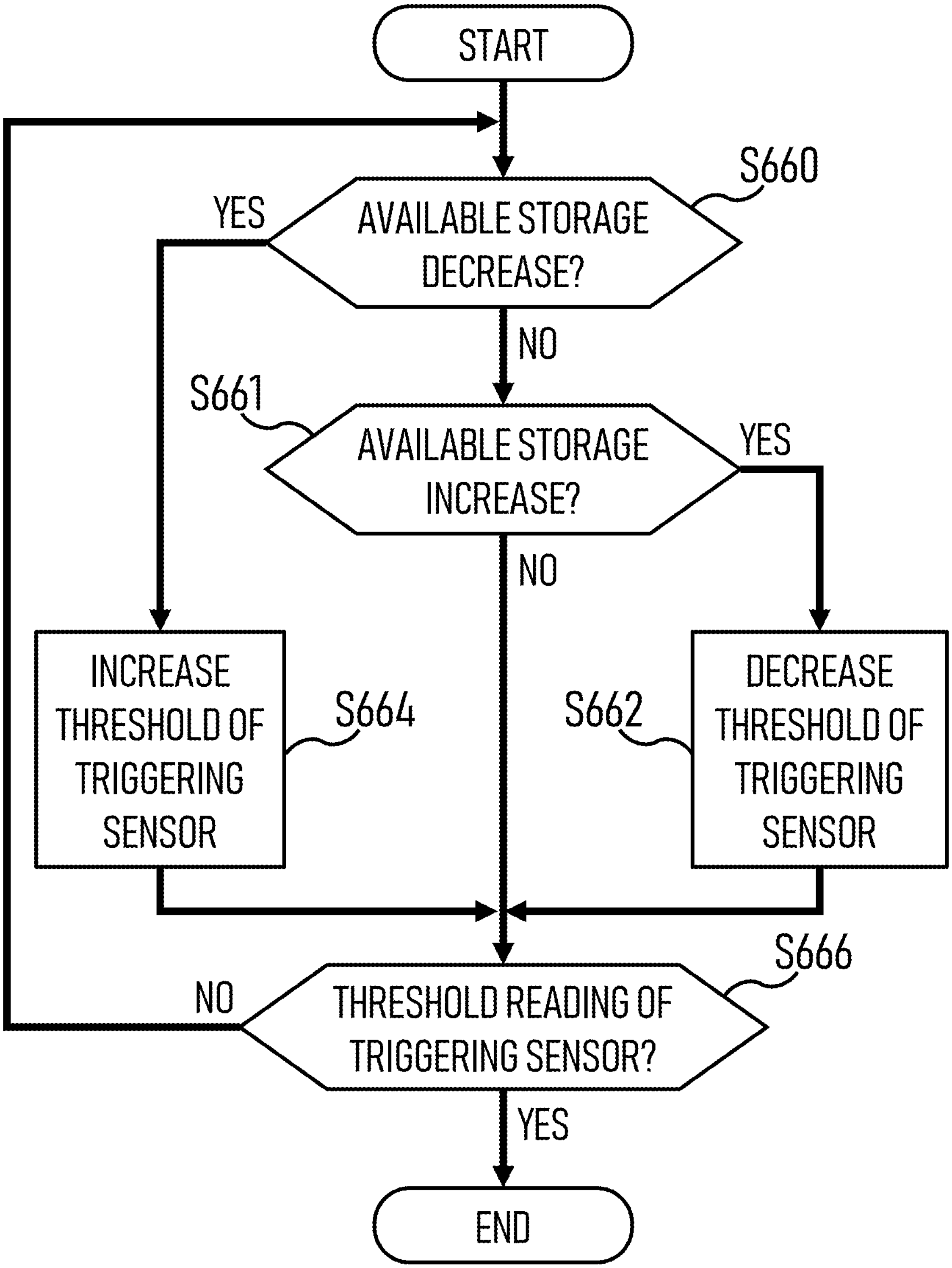
FIG. 6 is an operational flow for detecting a vehicle reaction in accordance with at least some embodiments of the subject disclosure.

FIG. 6 is an operational flow for detecting a vehicle reaction in accordance with at least some embodiments of the subject disclosure. The operational flow provides a method of detecting a vehicle reaction. In at least some embodiments, the detecting section adjusts the threshold reading based on an amount of available storage. In at least some embodiments, the method is performed by a vehicle, such as vehicle 140 shown in FIG. 1 or detecting vehicle system 410 shown in FIG. 4. In at least some embodiments, the method is performed by a detecting section of a controller, such as ECU 420 shown in FIG. 4 or controller 802 shown in FIG. 8.

At S660, the detecting section or a sub-section thereof determines whether the available storage is decreased. In at least some embodiments, the detecting section determines whether the amount of available storage is decreased. In response to the detecting section determining the amount of available storage is not decreased, the operational flow proceeds to determination of available storage increase at S661. In response to the detecting section determining the amount of available storage is decreased, the operational flow proceeds to increase the threshold of the triggering sensor at S664.

At S661, the detecting section or a sub-section thereof determines whether the available storage is increased. In at least some embodiments, the detecting section determines whether the amount of available storage is increased. In response to the detecting section determining the amount of available storage is not increased, the operational flow proceeds to the determination of whether the threshold reading of the triggering sensor is reached at S666. In response to the detecting section determining the amount of available storage is increased, the operational flow proceeds to decrease the threshold of the triggering sensor at S662.

At S662, the detecting section or a sub-section thereof decreases the threshold of the triggering sensor. In at least some embodiments, the detecting section decreases the threshold reading of the at least one triggering sensor. In at least some embodiments, the detecting section decreases the threshold reading of each triggering sensor by a fraction of the detection range of the triggering sensor.

At S664, the detecting section or a sub-section thereof increases the threshold of the triggering sensor. In at least some embodiments, the detecting section increases the threshold reading of the at least one triggering sensor. In at least some embodiments, the detecting section increases the threshold reading of each triggering sensor by a fraction of the detection range of the triggering sensor.

At S666, the detecting section or a sub-section thereof determines whether the threshold reading of the triggering sensor is reached. In at least some embodiments, the detecting section determines whether the threshold reading of the at least one triggering sensor of the vehicle is reached or exceeded. In response to the threshold reading of the triggering sensor being not reached, the operational flow returns to determination of available storage decrease at S660. In response to the threshold reading of the triggering sensor being reached, the operational flow ends, proceeding to sensor output recording, such as operation S552 of FIG. 5.

Figure 7:
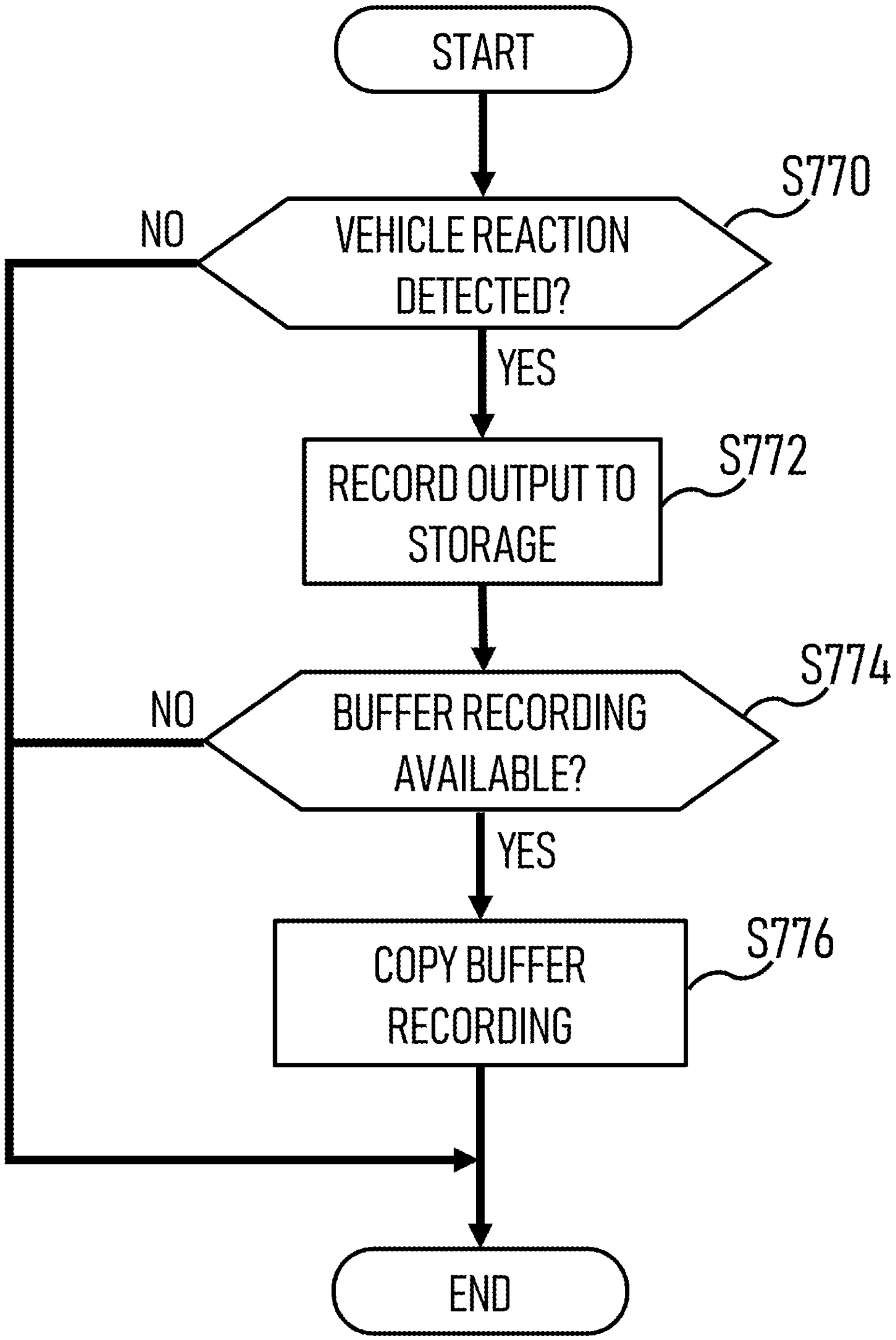
FIG. 7 is an operational flow for recording output of sensors in accordance with at least some embodiments of the subject disclosure.

FIG. 7 is an operational flow for recording a vehicle reaction in accordance with at least some embodiments of the subject disclosure. The operational flow provides a method of recording a detected vehicle reaction. In at least some embodiments, the method is performed by a vehicle, such as vehicle 140 shown in FIG. 1 or detecting vehicle system 410 shown in FIG. 4. In at least some embodiments, the method is performed by a recording section of the controller, such as ECU 420 shown in FIG. 4 or controller 802 shown in FIG. 8.

At S770, the recording section or a sub-section thereof confirms whether a vehicle reaction is detected. In response to a vehicle action being detected, the operational flow proceeds to record output to storage at S772. In response to no vehicle reaction being detected, the operational flow ends.

At S772, the recording section of the recording section or a sub-section thereof records an output to a storage. In at least some embodiments, the recording section records an output of the at least one triggering sensor and at least one related sensor of the vehicle in response to detecting the vehicle reaction. In at least some embodiments, the recording section records the output of the at least one triggering sensor and the at least one related sensor to a storage. In at least some embodiments, ECUs for monitoring such sensors are programmed to perform additional tasks to record the output of the instant sensor, related sensors, etc.

At S774, the recording section or a sub-section thereof determines whether a buffer recording is available. In at least some embodiments, the recording section determines whether a buffer memory recording of the sensors is available. In at least some embodiments, the buffer memory recording constantly holds a recording of the previous few seconds/minutes of every sensor. In response to a buffer recording being available, the operational flow proceeds to copy the buffer recording at S776. In response to no buffer recording being available, the operational flow ends.

At S776, the recording section or a sub-section thereof copies a buffer recording. In at least some embodiments, the recording section copies a buffer recording of the at least one triggering sensor and the at least one related sensor to the storage. In at least some embodiments, in the event of a trigger, the buffer memory recording of the relevant sensors is copied into storage to form the beginning of the recorded event, so as to make available the moments before the trigger.

Figure 8:
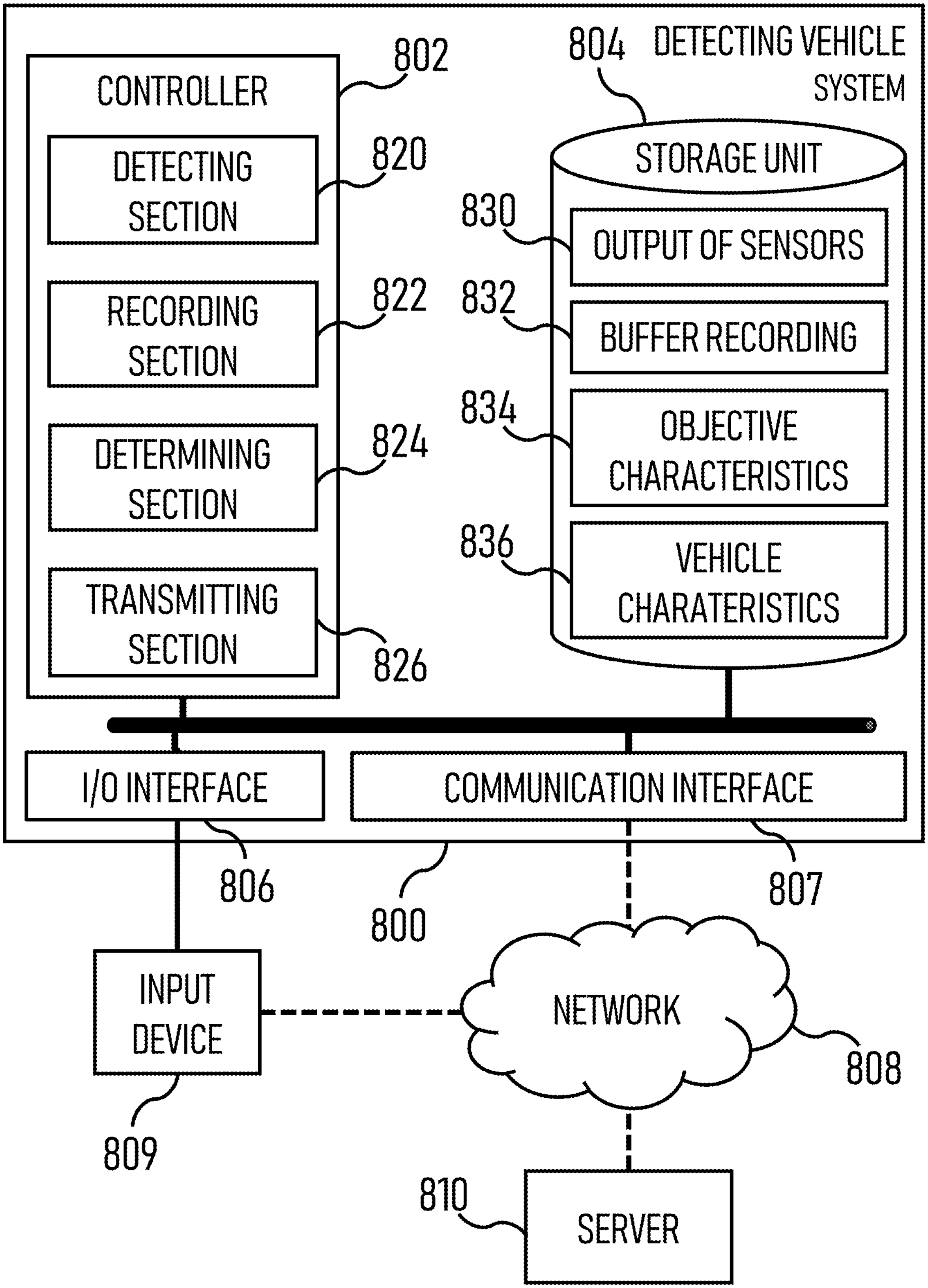
FIG. 8 is a diagram of a hardware configuration for vehicle event recording based terrain objective characteristic determination in accordance with at least some embodiments of the subject disclosure.

FIG. 8 is a diagram of a hardware configuration for program operation sequence determination for reduced potential leakage of personally identifiable information in accordance with at least some embodiments of the subject disclosure.

The exemplary hardware configuration includes detecting vehicle system 800, which interacts with input device 809, and communicates with input device 809 and server 810 through network 808. In at least some embodiments, detecting vehicle system 800 is a computer or other computing device that receives input or commands from input device 809 and server 810. In at least some embodiments, detecting vehicle system 800 is integrated with input device 809. In at least some embodiments, detecting vehicle system 800 is a computer system that executes computer-readable instructions to perform operations for vehicle recording based terrain objective characteristic determination.

Detecting vehicle system 800 includes a controller 802, a storage unit 804, an input/output interface 806, and a communication interface 807. In at least some embodiments, controller 802 includes a processor or programmable circuitry executing instructions to cause the processor or programmable circuitry to perform operations according to the instructions. In at least some embodiments, controller 802 includes analog or digital programmable circuitry, or any combination thereof. In at least some embodiments, controller 802 includes physically separated storage or circuitry that interacts through communication. In at least some embodiments, storage unit 804 includes a non-volatile computer-readable medium capable of storing executable and non-executable data for access by controller 802 during execution of the instructions. Communication interface 807 transmits and receives data from network 808. Input/output interface 806 connects to various input and output units, such as input device 809, via a parallel port, a serial port, a keyboard port, a mouse port, a monitor port, and the like to accept commands and present information. In some embodiments, storage unit 804 is external from server 800.

Controller 802 includes detecting section 820, recording section 822, determining section 824, and transmitting section 826. Storage unit 804 includes output of sensors 830, buffer recording 832, objective characteristics 834, and vehicle characteristics 836.

Detecting section 820 is the circuitry or instructions of controller 802 configured to detect a vehicle reaction. In at least some embodiments, detecting section 820 is configured to detect a vehicle reaction of a vehicle, the vehicle reaction triggered by a threshold reading of at least one triggering sensor of the vehicle. In at least some embodiments, detecting section 820 utilizes information in storage unit 804, such as output of sensors 830. In at least some embodiments, detecting section 820 includes sub-sections for performing additional functions, as described in the foregoing flow charts. In at least some embodiments, such sub-sections is referred to by a name associated with a corresponding function.

Recording section 822 is the circuitry or instructions of controller 802 configured to record output of sensors. In at least some embodiments, recording section 822 is configured to record an output of the at least one triggering sensor and at least one related sensor of the vehicle in response to detecting the vehicle reaction. In at least some embodiments, recording section 822 utilizes information in storage 804, such as output of sensors 830, and records information in storage unit 804, such as buffer recording 832. In at least some embodiments, recording section 822 includes sub-sections for performing additional functions, as described in the foregoing flow charts. In at least some embodiments, such sub-sections is referred to by a name associated with a corresponding function.

Determining section 824 is the circuitry or instructions of controller 802 configured to determine an objective characteristic of terrain. In at least some embodiments, determining section 824 is configured to determine an objective characteristic of a terrain based on the recorded output of the at least one triggering sensor, the recorded output of the at least one related sensor, and at least one characteristic of the vehicle. In at least some embodiments, determining section 824 utilizes information in storage unit 804, such as output of sensors 830, buffer recording 832 and vehicle characteristics 836, and records information in storage unit 804, such as objective characteristics 834. In at least some embodiments, determining section 824 includes sub-sections for performing additional functions, as described in the foregoing flow charts. In at least some embodiments, such sub-sections is referred to by a name associated with a corresponding function.

Transmitting section 826 is the circuitry or instructions of controller 802 configured to transmit objective characteristic. In at least some embodiments, transmitting section 826 is configured to transmit the objective characteristic to a server through a network. In at least some embodiments, transmitting section 826 is configured to transmit the objective characteristic directly to another vehicle. In at least some embodiments, transmitting section 826 transmits information from storage unit 804 to network 808, such as objective characteristics 834. In at least some embodiments, transmitting section 826 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages, or modern systems languages such as Rust, or interface languages such as Dart. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, vehicle recording based terrain objective characteristic determination is performed by detecting a vehicle reaction of a vehicle, the vehicle reaction triggered by a threshold reading of at least one triggering sensor of the vehicle, recording an output of the at least one triggering sensor and at least one related sensor of the vehicle in response to detecting the vehicle reaction, and determining an objective characteristic of a terrain based on the recorded output of the at least one triggering sensor, the recorded output of the at least one related sensor, and at least one characteristic of the vehicle.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

detecting an automatic vehicle-controlled reaction of a vehicle, the vehicle reaction triggered by a threshold reading of at least one triggering sensor of the vehicle;

recording an output of the at least one triggering sensor and at least one related sensor of the vehicle in response to detecting the vehicle reaction; and determining an objective characteristic of a ground surface of a terrain based on the recorded output of the at least one triggering sensor, the recorded output of the at least one related sensor, and at least one characteristic of the vehicle, wherein the determining comprises analyzing the recorded output of the at least one triggering sensor and the recorded output of the at least one related sensor, and normalizing a characteristic of the ground surface of the terrain with respect to the at least one characteristic of the vehicle to reveal the objective characteristic.

2. The method of claim 1, wherein the recording comprises:

recording the output of the at least one triggering sensor and the output of the at least one related sensor to a storage; and copying a buffer recording of the at least one triggering sensor and the at least one related sensor to the storage.

3. The method of claim 1, further comprising:

transmitting the objective characteristic to a server through a network.

4. The method of claim 1, further comprising:

transmitting the objective characteristic directly to another vehicle.

5. The method of claim 1, further comprising:

adjusting the threshold reading based on an amount of available storage.

6. The method of claim 5, wherein the adjusting further comprises at least one of:

decreasing the threshold reading in response to an increase in the amount of available storage; or increasing the threshold reading in response to a decrease in the amount of available storage.

7. The method of claim 1, wherein the at least one related sensor comprises a GPS sensor.

8. The method of claim 1, wherein the at least one characteristic of the vehicle comprises at least one of a static characteristic based on make and model of the vehicle or a dynamic characteristic of the vehicle at a time of the recording.

9. The method of claim 1, wherein the threshold reading value is obtained from Operational Design Domain (ODD).

10. The method of claim 1, wherein the automatic vehicle-controlled reaction is due to the ground surface of the terrain.

11. A non-transitory computer-readable medium having instructions recorded thereon that are executable by one or more processors to perform operations comprising:

detecting an automatic vehicle-controlled reaction of a vehicle, the vehicle reaction triggered by a threshold reading of at least one triggering sensor of the vehicle;

recording an output of the at least one triggering sensor and at least one related sensor of the vehicle in response to detecting the vehicle reaction; and determining an objective characteristic of a ground surface of a terrain based on the recorded output of the at least one triggering sensor, the recorded output of the at least one related sensor, and at least one characteristic of the vehicle, wherein the determining comprises analyzing the recorded output of the at least one triggering sensor and the recorded output of the at least one related sensor, and normalizing a characteristic of the ground surface of the terrain with respect to the at least one characteristic of the vehicle to reveal the objective characteristic.

12. The non-transitory computer-readable medium of claim 11, wherein the recording comprises:

recording the output of the at least one triggering sensor and the at least one related sensor to a storage; and copying a buffer recording of the at least one triggering sensor and the at least one related sensor to the storage.

13. The non-transitory computer-readable medium of claim 11, wherein the operations further comprise:

transmitting the objective characteristic to a server through a network.

14. The non-transitory computer-readable medium of claim 11, wherein the operations further comprise:

transmitting the objective characteristic directly to another vehicle.

15. The non-transitory computer-readable medium of claim 11, wherein the operations further comprise:

adjusting the threshold reading based on an amount of available storage.

16. The non-transitory computer-readable medium of claim 15, wherein the adjusting further comprises at least one of:

decreasing the threshold reading in response to an increase in the amount of available storage; or increasing the threshold reading in response to a decrease in the amount of available storage.

17. The non-transitory computer-readable medium of claim 11, wherein the at least one related sensor comprises a GPS sensor.

18. The non-transitory computer-readable medium of claim 11, wherein the at least one characteristic of the vehicle comprises at least one of a static characteristic based on make and model of the vehicle or a dynamic characteristic of the vehicle at a time of the recording.

19. The non-transitory computer-readable medium of claim 11, wherein the threshold reading value is obtained from Operational Design Domain (ODD).

20. An apparatus comprising:

a controller including circuitry configured to detect an automatic vehicle-controlled reaction of a vehicle, the vehicle reaction triggered by a threshold reading of at least one triggering sensor of the vehicle, record an output of the at least one triggering sensor and at least one related sensor of the vehicle in response to detecting the vehicle reaction, and determine an objective characteristic of a ground surface of a terrain based on the recorded output of the at least one triggering sensor, the recorded output of the at least one related sensor, and at least one characteristic of the vehicle, wherein the determining comprises analyzing the recorded output of the at least one triggering sensor and the recorded output of the at least one related sensor, and normalizing a characteristic of the ground surface of the terrain with respect to the at least one characteristic of the vehicle to reveal the objective characteristic.

* * * * *